(12) United States Patent
Xiong

(10) Patent No.: US 8,013,661 B2
(45) Date of Patent: Sep. 6, 2011

(54) NEGATIVE VOLTAGE GENERATING CIRCUIT

(75) Inventor: Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 920 days.

(21) Appl. No.: 11/967,042

(22) Filed: Dec. 29, 2007

(65) Prior Publication Data

US 2009/0154207 A1 Jun. 18, 2009

(30) Foreign Application Priority Data

Dec. 14, 2007 (CN) .......................... 2007 1 0203093

(51) Int. Cl.
*G11C 5/14* (2006.01)
*G09F 9/00* (2006.01)

(52) U.S. Cl. .................................... 327/530; 340/815.44

(58) Field of Classification Search .................. 363/124; 340/815.44

See application file for complete search history.

(56) References Cited

U.S. PATENT DOCUMENTS

| 4,142,114 A | * | 2/1979 | Green | 327/536 |
| 4,697,220 A | * | 9/1987 | Chung | 361/100 |
| 2009/0102543 A1 | * | 4/2009 | Xiong | 327/530 |

FOREIGN PATENT DOCUMENTS

GB 2383479 * 6/2003

* cited by examiner

*Primary Examiner* — Jacob Y Choi
*Assistant Examiner* — Henry Luong
(74) *Attorney, Agent, or Firm* — Altis Law Group, Inc.

(57) ABSTRACT

A negative voltage generating circuit includes a pulse generator U1, a switch, a resistor, a first capacitor, a first diode, a second diode, and a second capacitor. The pulse generator includes a positive voltage input pin coupled to a power supply, an oscillating output pin, and a negative voltage input pin. The switch includes a first terminal coupled to the oscillating output pin, a second terminal coupled to one terminal of the first capacitor, and coupled to the power supply via the resistor, and a third terminal being grounded. Another terminal of the first capacitor is coupled to the anode of the fist diode and the cathode of the second diode. The cathode of the first diode is grounded. The anode of the second diode is coupled to the positive voltage input pin of the pulse generator, and is coupled to ground via the second capacitor.

7 Claims, 1 Drawing Sheet

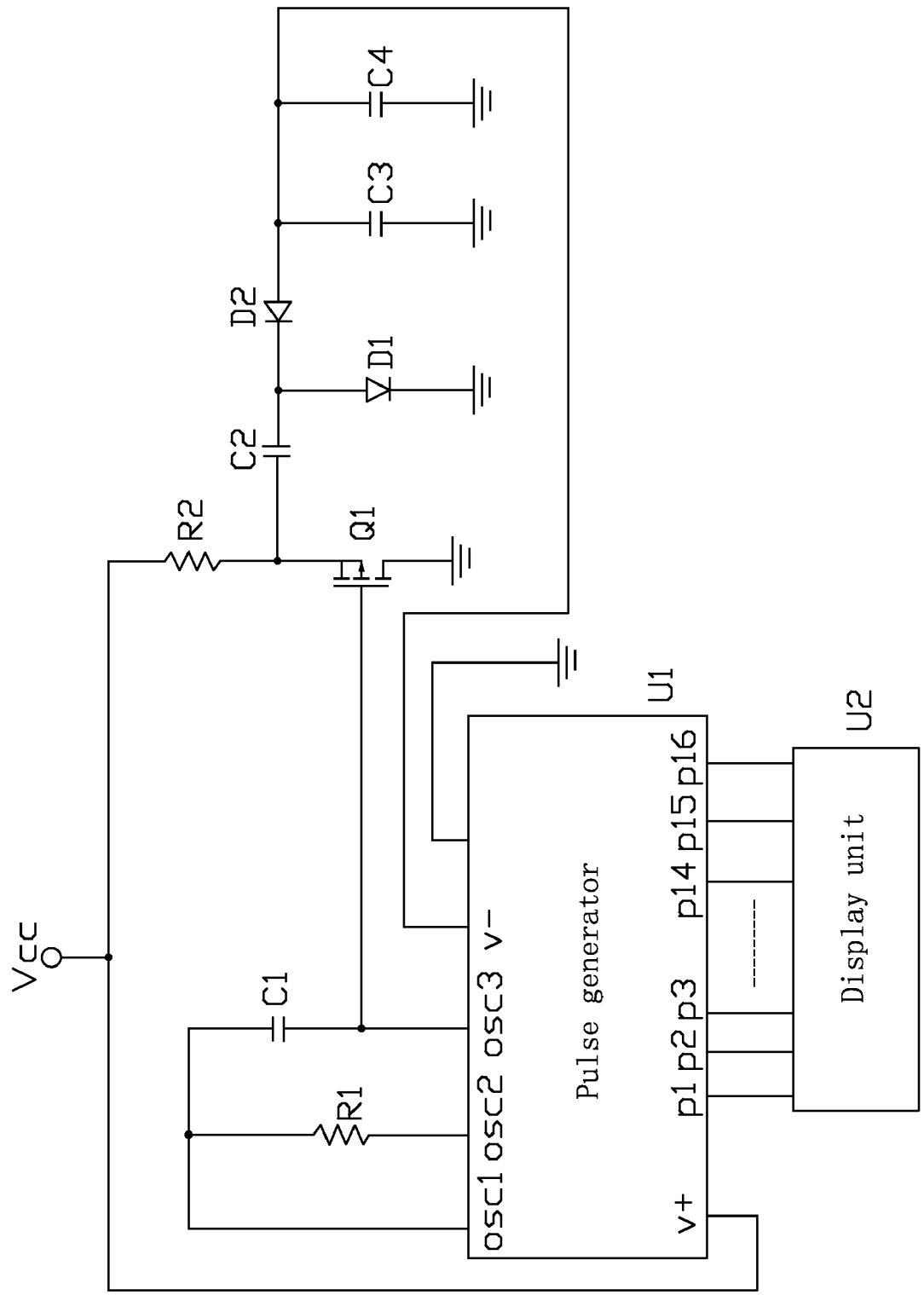

NEGATIVE VOLTAGE GENERATING CIRCUIT

BACKGROUND

1. Field of the Invention

The present invention relates to a negative voltage generating circuit.

2. Description of Related Art

With rapid development of electronic technology, more and more electronic systems need both positive and negative voltages to operate, for example, operational amplifiers and computer PCI (Peripheral Component Interconnect) cards require negative voltage to operate.

What is desired, therefore, is to provide a simple low-cost negative voltage generating circuit for providing a negative voltage.

SUMMARY

An exemplary negative voltage generating circuit includes a pulse generator U1 alternately outputting a high level signal and a low level signal, a switch, a resistor, a first capacitor, a first diode, a second diode, and a second capacitor. The pulse generator includes a positive voltage input pin, an oscillating output pin, and a negative voltage input pin. The switch includes a first terminal, a second terminal, and a third terminal. The positive voltage input pin is coupled to a power supply. The first terminal of the switch is coupled to the oscillating output pin. The second terminal of the switch is coupled to one terminal of the first capacitor, and is coupled to the power supply via the resistor. The third terminal of the switch is grounded. Another terminal of the first capacitor is coupled to the anode of the fist diode and the cathode of the second diode. The cathode of the first diode is grounded. The anode of the second diode is coupled to the positive voltage input pin of the pulse generator, and is coupled to ground via the second capacitor.

Other advantages and novel features of the present invention will become more apparent from the following detailed description of preferred embodiment when taken in conjunction with the accompanying drawing, in which:

BRIEF DESCRIPTION OF THE DRAWINGS

The Drawing is a circuit diagram of a negative voltage generating circuit in accordance with an embodiment of the present invention.

DETAILED DESCRIPTION

Referring to the drawing, a negative voltage generating circuit in accordance with an embodiment of the present invention includes a pulse generator U1 alternately outputting a high level signal and a low level signal, a display unit U2, two resistors R1, R2, a MOSFET Q1, four capacitors C1~C4, and two diodes D1, D2.

The pulse generator U1 includes a positive voltage input pin V+, a first oscillating output pin osc1, a second oscillating output pin osc2, a third oscillating output pin osc3, a negative voltage input pin V-, and a plurality of data output pins p1~p16. The positive voltage input pin V+ is coupled to a power supply Vcc, the second oscillating output pin osc2 is coupled to the first oscillating output pin osc1 via the resistor R1, the plurality of data output pins p1~p16 is electrically coupled to the display unit U2 via a plurality of transmission lines. The gate of the MOSFET Q1 is coupled to the third oscillating output pin osc3 of the pulse generator U1. The source of the MOSFET Q1 is coupled to one terminal of the capacitor C2, and is coupled to the power supply Vcc via the resistor R2. The drain of the MOSFET Q1 is grounded. Another terminal of the capacitor C2 is coupled to the anode of the diode D1 and the cathode of the diode D2. The cathode of the diode D1 is grounded. The anode of the diode D2 is coupled to the negative voltage input pin V- of the pulse generator U1, and is coupled to ground via the capacitors C3, C4 connected in parallel.

In this embodiment, the MOSFET Q1 is a P-channel MOSFET. The diode D1 is a Schottky diode. The pulse generator U1 is an ICL7107 type A/D converter produced by INTERSIL Corporation in USA. The display unit U2 is a digital display panel including a plurality of LED digital tube.

In use, the third oscillating output pin osc3 of the pulse generator U1 alternately outputs a high level and a low level pulse signal. When the third oscillating output pin osc3 outputs a high level signal, the MOSFET Q1 turns off, and the power supply Vcc charges the capacitor C2. When the capacitor C2 is fully charged, no current passes through the resistor R2, the diode D1 has a voltage drop (such as 0.2 V), thereby; the full voltage of the capacitor C2 equals the difference between the voltage of the power supply Vcc and the voltage of the diode D1.

When the third oscillating output pin osc3 outputs a low level signal, the MOSFET Q1 turns on, the source of the MOSFET Q1 outputs a low level signal, therefore, the voltage of the one terminal of the capacitor C2 is 0V, and a voltage of the another terminal of the capacitor C2 is negative. So the capacitor C2 discharges through the capacitors C3, C4, and the diode D2, and the negative voltage input pin V- receives a negative voltage from the anode of the diode D2.

When the third oscillating output pin osc3 outputs high level and low level signals alternately, the capacitor C2 charges and discharges continuously. When the third oscillating output pin osc3 outputs a low level signal, the capacitor C2 discharges through the capacitors C3, C4, and the diode D2, at the same time, the capacitors C3 and C4 are charged. When the third oscillating output pin osc3 outputs a high level signal, the capacitor C2 is charged, at the same time, the capacitors C3 and C4 discharge through the diode D1, the negative voltage input pin V- stably and continuously receives a negative voltage from the anode of the diode D2.

For example, when the third oscillating output pin osc3 outputs a high level signal, the capacitor C2 is charged, and the full voltage of the capacitor C2 equals the difference between the power supply Vcc and the voltage of the diode D1. When the third oscillating output pin osc3 outputs a low level signal, a voltage of the one terminal of the capacitor C2 is 0V, and a voltage of the another terminal of the capacitor C2 is negative, the capacitor C2 discharges through the capacitors C3, C4, and the diode D2, the negative voltage input pin V- receives a negative voltage from the anode of the diode D2, the value of the negative voltage equals the difference between the voltage of the capacitor C2 and the voltage of the diode D2. The display unit U2 is configured for displaying value of the negative voltage received at the negative voltage input pin V- of the pulse generator U1.

Because the negative voltage generating circuit can comprise one or more diodes connected between the another terminal of the capacitor C2 and ground, which essentially forms a voltage dividing circuit, voltage received at the negative voltage input pin V- of the pulse generator U1 can be selected according to the value and number of diodes used therein, The negative voltage generating circuit is simple, and low-cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A negative voltage generating circuit, comprising:
   a pulse generator having a positive voltage input pin coupled to a power supply, an oscillating output pin alternately outputting a high level signal and a low level signal, and a negative voltage input pin;
   a switch having a first terminal coupled to the oscillating output pin of the pulse generator, a second terminal coupled to the power supply via a resistor, and a third terminal grounded;
   a first capacitor having one terminal coupled to the first terminal of the switch;
   at least one first diode, the anode of the at least one first diode coupled to another terminal of the capacitor, the cathode of the at least one first diode coupled to ground;
   a second diode, the anode of the second diode coupled to the negative voltage input pin of the pulse generator, the cathode of the second diode coupled to the anode of the at least one first diode; and
   a second capacitor coupled between the anode of the second diode and ground.

2. The negative voltage generating circuit as claimed in claim 1, wherein the pulse generator further comprises a plurality of data output pins electrically coupled to a display panel for displaying value of the negative voltage received at the negative voltage input pin of the pulse generator.

3. The negative voltage generating circuit as claimed in claim 1, further comprising a third capacitor coupled between the anode of the second diode and ground.

4. The negative voltage generating circuit as claimed in claim 1, wherein the switch is a P-channel MOSFET, the first, second, and third terminals of the switch are respectively gate, source, and drain of the P-channel MOSFET.

5. The negative voltage generating circuit as claimed in claim 1, wherein the first diode is a Schottky diode.

6. The negative voltage generating circuit as claimed in claim 1, further comprising a third diode coupled between the cathode of the first diode and ground.

7. The negative voltage generating circuit as claimed in claim 2, wherein the display panel comprises a plurality of LED digital tubes.

* * * * *